Oct. 4, 1960  F. S. FLICK  2,954,754

VALVE OPERATOR UNIT

Filed Sept. 24, 1956

Inventor:
Francis S. Flick
By: Schroeder, Hofgren,
Brady & Wegner
Attorneys

United States Patent Office 2,954,754
Patented Oct. 4, 1960

2,954,754

VALVE OPERATOR UNIT

Francis S. Flick, Oak Park, Ill., assignor to Flick-Reedy Corporation, a corporation of Illinois Filed Sept. 24, 1956, Ser. No. 611,539

5 Claims. (Cl. 121—38)

This application relates to a valve operator and more particularly to a package power unit which may be placed on any one of several valve sizes and classes to provide an operator for the valve.

The present power unit is primarily intended to be used as an operator for valves of the butterfly type or similar valves having a similarly required motion for opening and closing the valve. Valves of this type have a closure member, or disk, which may be turned within a valve case through 90° to effect opening and closing of the valve. Other types of valves including cone, spherical and ball types employ a similar motion in opening and closing.

In the past, valves have been constructed to meet particular specifications of the environment in which they are to be used. The size of the valves varies as well as the amount of material used in the valve to meet pressure situations. Each valve was, therefore, of a somewhat special design for the particular job. Some of the valves were quite large so that power operators were required to open and close them. In the latter instance, the operators generally were of a special design for each valve and no stock, or uniform, type of operator was available for use on a line of valves.

The present invention provides a compact power unit which can be attached to any one of a number of different valves in order to provide an operator for the valve. It is, therefore, the principal object of this invention to provide a new and improved package valve operator.

Another object is to provide a valve operator unit that may be selectively attached to any one of a number of different sizes and classes of valves.

A further object is to provide a compact power unit which may be attached as an operator for a valve and which may be manufactured in different sizes with a minimum number of parts.

Other objects, features and advantages of the present invention will be apparent from the following description of a preferred embodiment of the invention illustrated in the accompanying drawings in which.

Figure 1:
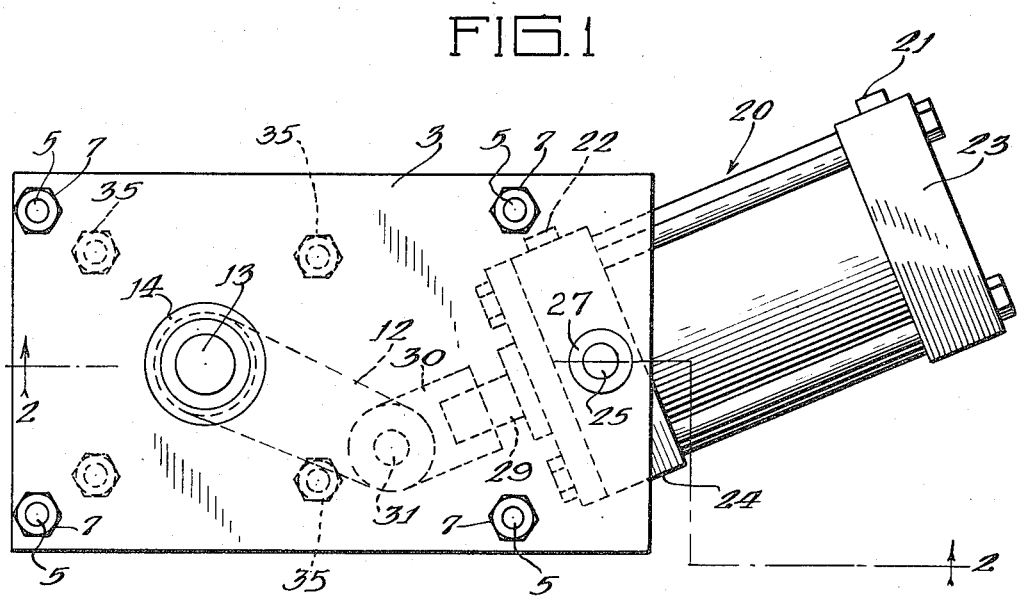
Figure 1 is a plan view of a valve operator embodying the invention.

Whereas in the past valve operators have been an expensive custom made piece of machinery, the present operator permits a relatively stock item to be used on a considerale number of different valve sizes. The valves usually have a bonnet with a base about the valve shaft supporting the disk, or valve closure. This base provides a convenient means for attaching an operator for turning the shaft. The unit here involved is intended for placement on a valve without altering the valve or its bonnet.

Referring to the figures of the drawing, the operator is housed within a frame including a top plate 3 and a bottom plate 4 spaced apart in parallel relation by a number of supporting tie rods or posts 5 and spacing collars 6 which hold the plates in this relation. The spacing collars may conveniently be made of standard commercial pipe and bear against the inner surface of the plates. The posts are additionally threaded on either end in order to receive retaining nuts 7. The frame thus constructed of the parallel base plates 3 and 4, the posts 5 and collars 6 is a fairly rigid structure.

The power operator parts are mounted within the frame and include a crank 10 having a hollow hub or sleeve portion 11 and an arm 12. The crank is pivotally mounted between the plates 3 and 4 by extending trunnions or end portions thereof into bushings 14 and 15 press fitted into the plates 3 and 4. The arm is formed of a pair of spaced plates 16 and 17 welded to the hollow hub 11. A plug 13 may be used in the upper end of the hollow hub to keep out dirt, etc., if desired.

The motive power for turning the crank in the present operator is provided by a piston and cylinder device 20, which may be operated either with a liquid or pneumatically. Ordinarily, is is preferred that the piston and cylinder device be double acting so that fluid inlets and outlets 21 and 22, placed on the side of the heads 23 and 24, are provided. The piston and cylinder device is also mounted within the frame of the unit and for this purpose, stub shafts 25 and 26 are attached to the head 24 so as to extend into bushings 27 and 28 respectively in the plates of the frame. These stub shafts act as trunnions pivotally mounting the piston and cylinder device for swinging movement in a plane parallel to the plane of movement of the crank.

A connection is provided between the fluid motor and the crank by connecting the piston rod 29 by means of connector 30 to the arm 12 of the crank with a pivotal connection provided by the pin 31. The trunnion mounting of the piston and cylinder allows it to swing as the crank 10 is turned through approximately 90° to effect opening and closing of the valve with which it is associated.

The structure of the operator is such that the forces exerted on the frame by the cylinder and the crank are balanced. It should be noted that the crank and cylinder are both centered between the plates so that one-half of the reaction of each is taken up by one plate. Even with the nuts 7 on the posts loose, the operator will function satisfactiorily because of the balanced load or force carried in the plate without transfer through the posts. No misalignment of the operator and valve shaft will occur and thus the unit is particularly adapted for long service life.

Figure 2:
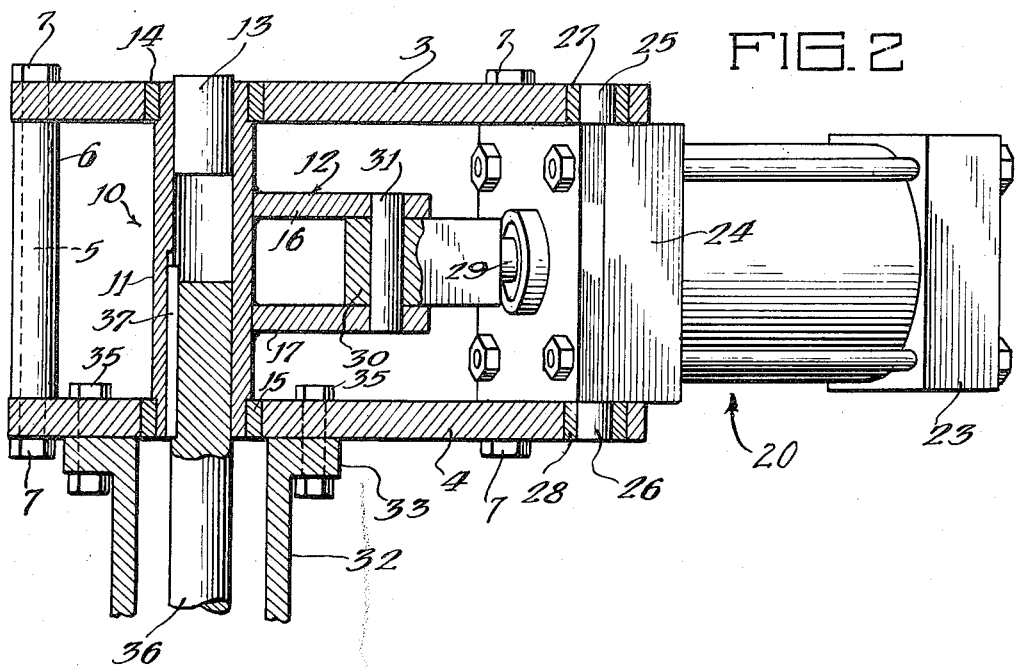
Figure 2 is a vertical sectional view with parts broken away taken through the valve operator of Figure 1 substantially along line 2—2.

One important feature of the present valve operator is its ease of mounting on existing valve structures. In Figure 2, the bonnet or shaft housing 32 of a valve is shown with the base plate 33 against which the plate 4 of the frame abuts. The base plates of the valves are usually provided with a number of bolt holes so that the plate 4 of the frame may be drilled with a similar pattern permitting bolting of the power unit directly to the valve. In Figure 1, four such bolts 35 are shown in dotted outline illustrating the means for securing the operator to the base 33 of the valve. Individual bolt openings may thus be drilled for receiving bolts 35 fastening the operator to a valve. Different valves may have different patterns of bolt openings so that it is preferred to drill the plates 4 of the operators only after it is determined which valve of a line is to receive the operator. This can be done in the field very easily with the usual tools available.

The connection between the valve shaft and the present operator may be simply effected by inserting the valve shaft 36 within the sleeve 11. Ordinarily, the valve shafts are provided with a keyway for the reception of a key 37 permitting the sleeve and shaft to be fastened together.

It is usually preferred to use a shrink fit for this connection. In the event it is desired to make the operator easily removable from the valve, a spline connection is preferred so that the operator may be simply removed by unbolting it from the valve bonnet base and pulling the operator upwardly from the valve shaft 36.

Some valves may require a larger piston and cylinder device than others. In the manufacture of the power unit, it is only necessary to have a stock of different length posts 5 and spacers 6 in order to accommodate piston and cylinder devices of larger or smaller diameters. A few crank sizes 10 will generally accommodate the variance in sizes of the operators. Only a few plates are required with particular sized bushings in order to make up sufficiently different sizes of operators for all valves of a particular line. The power unit is compact and self-contained so that it may be used on one valve and then changed to another one if desired. A supply of operators as stock items permits the adaptation of an operator to a valve within a short time simplifying the installation and reducing the cost of providing operators for valves.

The foregoing detailed description has been given for clearness of understanding only, and no unnecessary limitations should be understood therefrom, for some modifications will be obvious to those skilled in the art.

I claim:

1. A package power unit for imparting rotary motion to a shaft, comprising: a rotary shaft; a housing surrounding said shaft; a rigid frame including a pair of spaced plates; a crank having a pair of trunnions at its opposite ends each pivotally mounted in a respective plate, one of the trunnions including a hollow portion extending through one of the plates and receiving one end of said shaft telescoped into the hollow portion for rotating the shaft; and a piston and cylinder motor device operatively connected to the crank and having a pair of trunnions pivotally mounting the device on and between the plates, one of the plates having means detachably mounting the power unit to said housing.

2. A package power unit as specified in claim 1 in which the trunnions on the motor device are attached to a head of the cylinder at the piston rod end and the cylinder extends outwardly from between the plates of the frame so as to be freely pivotally movable in operating said crank, said plates balancing the reactive forces from said cylinder and crank during operation of the unit.

3. A valve operator unit for a valve comprising a rotary shaft; a housing surrounding said shaft; a rigid frame having means demountably attaching said frame to said housing adjacent an end of said shaft; a crank pivotally mounted on and within the frame; a fluid operated piston and cylinder motor also pivotally mounted on and within the frame and having a piston rod connected to the crank for imparting rotary motion to the crank; said crank having a sleeve portion providing at least one pivotal mounting thereof, and said sleeve portion being exposed outwardly of said frame and receiving said end of the shaft for coupling thereto.

4. A valve operator unit for a butterfly valve comprising: a rotary shaft; a housing surrounding said shaft; a frame having means demountably attaching said frame to said housing adjacent one end of said shaft, said frame including spaced plates and a plurality of spacing posts therebetween; a crank pivotally mounted at one end between and carried by said plates; a fluid operated piston and cylinder motor also pivotally mounted between and carried by said plates and having a piston rod operatively connected to the other end of the crank to provide movement of the crank, said plates each carrying and balancing forces between said cylinder and crank to prevent transferring said forces through the posts, and said crank having a sleeve portion journalling the crank in the plates and being open outwardly of the frame and receiving said one end of said shaft, said sleeve providing means securing the crank to the shaft.

5. A power unit for operating a rotary valve, comprising: a rotary shaft; a housing surrounding said shaft; a rigid frame having spaced base plates, one of said base plates providing means removably attaching the unit to said housing; a crank having trunnions at its opposite ends providing pivotal support on and between the plates, the trunnion adjacent said one base plate comprising a hollow hub receiving and operatively engaging one end of said rotary shaft to turn the shaft when the crank is turned; and a piston and cylinder device operatively connected to the crank and pivotally mounted on and between the plates, said plates balancing the force reaction of said cylinder and crank when the crank is turned to rotate said shaft.

References Cited in the file of this patent

UNITED STATES PATENTS

| | | |
|---|---|---|
| 26,664 | Cridge | Jan. 3, 1860 |
| 2,194,374 | Wunsch | Mar. 19, 1940 |
| 2,290,527 | Bergtholdt | July 21, 1942 |
| 2,316,052 | Dach | Apr. 6, 1943 |
| 2,324,224 | Meredith | July 13, 1943 |
| 2,386,589 | Caldwell | Oct. 9, 1945 |
| 2,390,882 | Hopkins | Dec. 11, 1945 |
| 2,911,953 | Killian | Nov. 10, 1959 |